(12) United States Patent
Sun et al.

(10) Patent No.: US 11,606,777 B2
(45) Date of Patent: Mar. 14, 2023

(54) TECHNIQUES FOR ADAPTIVE SUB-BAND USAGE FOR UPLINK CONTROL CHANNEL

(71) Applicant: QUALCOMM Incorporated, San Diego, CA (US)

(72) Inventors: Jing Sun, San Diego, CA (US); Tanumay Datta, Bangalore (IN); Kapil Bhattad, Bangalore (IN); Ananta Narayanan Thyagarajan, Bangalore (IN); Xiaoxia Zhang, San Diego, CA (US); Pravjyot Singh Deogun, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 16/879,254

(22) Filed: May 20, 2020

(65) Prior Publication Data

US 2021/0037501 A1 Feb. 4, 2021

(30) Foreign Application Priority Data

Jul. 1, 2019 (IN) .............................. 201941026271

(51) Int. Cl.
*H04W 72/02* (2009.01)
*H04W 72/04* (2023.01)
(Continued)

(52) U.S. Cl.
CPC ........... *H04W 72/02* (2013.01); *H04W 16/14* (2013.01); *H04W 72/0413* (2013.01); *H04W 72/0453* (2013.01); *H04W 74/0808* (2013.01)

(58) Field of Classification Search
CPC ............. H04W 72/02; H04W 72/0413; H04W 72/0453; H04W 74/0808; H04W 16/14
See application file for complete search history.

(56) References Cited

U.S. PATENT DOCUMENTS

| | | | |
|---|---|---|---|
| 2015/0098412 A1* | 4/2015 | Yerramalli | H04W 74/0808 370/329 |
| 2019/0132861 A1* | 5/2019 | Koorapaty | H04W 76/27 |
| 2020/0221444 A1* | 7/2020 | Tiirola | H04L 1/1812 |

FOREIGN PATENT DOCUMENTS

WO WO-2010129885 A1 * 11/2010 ........... H04L 5/0048

OTHER PUBLICATIONS

Huawei et al.: "UL PHY channels for NR unlicensed", 3GPP Draf; R1-1810125, 3rd Generation Partnership Project (3GPP), Mobile Competence Centre; 650, Route Des Lucioles; F-06921 Sophia-Antipolis Cedex; France.*

(Continued)

*Primary Examiner* — Brenda H Pham
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify a control channel resource configuration associated with an unlicensed spectrum, wherein the control channel resource configuration is associated with an indication of whether a resource to be used for an uplink control channel in the unlicensed spectrum is a fixed resource, a floating resource, or an adaptive resource. The UE may identify the resource based at least in part on the control channel resource configuration. The UE may transmit uplink control information on the identified resource. Numerous other aspects are provided.

30 Claims, 10 Drawing Sheets

(51) Int. Cl.
H04W 72/0453 (2023.01)
H04W 74/08 (2009.01)
H04W 16/14 (2009.01)

(56) References Cited

OTHER PUBLICATIONS

Huawei, et al., "UL PHY Channels for NR Unlicensed", 3GPP Draft, R1-1810125, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517540, 20 pages, Retrieved from the Internet: URL: http://www.3gpp.org/ftp/tsg%5Fran/WG1%5FRL1/TSGR1%5F94b/Docs/R1%2D1810125%2Ezip. [retrieved on Sep. 29, 2018] 2.1 PRB based interlace 3. NR-U PUCCH Design 5. Conclusion.

Huawei et al., "NRU Wideband BWP Operation", 3GPP Draft, R1-1906048, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727505, 9 pages, Retrieved from the Internet: URL: http://www.3gpp.org/ftp/Meetings%5F3GPP%5FSYNC/RAN1/Docs/R1%2D1906048%2Ezip. [retrieved on May 13, 2019] the whole document.

International Search Report and Written Opinion—PCT/US2020/034013—ISA/EPO—dated Sep. 8, 2020.

Nokia, et al., "HARQ Scheduling and Feedback for NR-U", 3GPP Draft, R1-1906644, HARQ, 3rd Generation Partnership Project (3GPP), Mobile Competence Centre, 650, Route Des Lucioles, F-06921 Sophia-Antipolis Cedex, France, vol. RAN WG1, No. Renom, USA, May 13, 2019-May 18, 2019, May 13, 2019 (May 13, 2019), XP051728095, 14 pages, Retrieved from the Internet: URL: http://www.3gpp.org/ftp/Meetings%5F3GPP%5FSYNC/RAN1/Docs/R1%2D1906644%2Ezip. [retrieved on May 13, 2019] 3.4 Multiple HARQ feedback opportunities in frequency.

Oppo: "UL Signals and Channels for NR-U", 3GPP Draft, R1-1904893, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051700034, 4 pages, Retrieved from the Internet: URL: http://www.3gpp.org/ftp/Meetings%5F3GPP%5FSYNC/RAN1/Docs/R1%2D1904893%2Ezip. [retrieved on Apr. 7, 2019] 1. Introduction—2. PUCCH design.

Vivo: "Discussion on Physical UL Channel Design in Unlicensed Spectrum", 3GPP Draft, R1-1906129, Discussion on Physical UL Channel Design in Unlicensed Spectrum, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727585, 7 Pages, Retrieved from the Internet: URL: http://www.3gpp.org/ftp/Meetings%5F3GPP%5FSYNC/RAN1/Docs/R1%2D1906129%2Ezip. [retrieved on May 13, 2019] the whole document.

* cited by examiner

TECHNIQUES FOR ADAPTIVE SUB-BAND USAGE FOR UPLINK CONTROL CHANNEL

CROSS-REFERENCE TO RELATED APPLICATION

This Patent Application claims priority to Indian Patent Application No. 201941026271, filed on Jul. 1, 2019, entitled "TECHNIQUES FOR ADAPTIVE SUB-BAND USAGE FOR UPLINK CONTROL CHANNEL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for adaptive sub-band usage for an uplink control channel.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a control channel resource configuration associated with an unlicensed spectrum, wherein the control channel resource configuration is associated with an indication of whether a resource to be used for an uplink control channel in the unlicensed spectrum is a fixed resource, a floating resource, or an adaptive resource; identifying the resource based at least in part on the control channel resource configuration; and transmitting uplink control information on the identified resource.

In a first aspect, identifying the resource is based at least in part on whether a sub-band in which the resource is included is a floating sub-band or a fixed sub-band.

In a second aspect, alone or in combination with the first aspect, when the sub-band is a floating sub-band, identifying the resource further comprises identifying the resource based at least in part on the sub-band being identified by a configured list of sub-bands.

In a third aspect, alone or in combination with one or more of the first and second aspects, when the resource is an adaptive resource, identifying the resource further comprises identifying the resource based at least in part on a mapping of resources and corresponding sub-bands and based at least in part on an indication, in the control channel resource configuration, indicating which resource is to be used.

In a fourth aspect, alone or in combination with one or more of the first through third aspects, identifying the resource further comprises identifying an interlace configuration for the uplink control channel from a plurality of interlace configurations associated with a set of sub-bands.

In a fifth aspect, alone or in combination with one or more of the first through fourth aspects, the interlace configuration uses a smallest number of resource blocks of respective quantities of resource blocks associated with the plurality of interlace configurations.

In a sixth aspect, alone or in combination with one or more of the first through fifth aspects, the uplink control channel uses all resource blocks of the interlace configuration.

In a seventh aspect, alone or in combination with one or more of the first through sixth aspects, the uplink control channel spans a single sub-band.

In an eighth aspect, alone or in combination with one or more of the first through seventh aspects, the uplink control channel spans multiple sub-bands.

In a ninth aspect, alone or in combination with one or more of the first through eighth aspects, a number of resource blocks used for the resource is proportionate to a number of sub-bands included in the multiple sub-bands.

In a tenth aspect, alone or in combination with one or more of the first through ninth aspects, a number of resource blocks used for the resource is independent of a number of sub-bands included in the multiple sub-bands.

In an eleventh aspect, alone or in combination with one or more of the first through tenth aspects, the UE may receive information indicating at least one of a periodicity or an offset of the resource blocks used for the resource.

In a twelfth aspect, alone or in combination with one or more of the first through eleventh aspects, the UE may determine a periodicity of the resource blocks based at least in part on the number of the resource blocks and identities of the multiple sub-bands.

In a thirteenth aspect, alone or in combination with one or more of the first through twelfth aspects, the UE may receive information indicating whether a number of resource blocks used for the resource is proportionate to or independent of a number of sub-bands included in the multiple sub-bands.

In a fourteenth aspect, alone or in combination with one or more of the first through thirteenth aspects, the information indicating whether the number of resource blocks used for the resource is proportionate to or independent of the number of sub-bands included in the multiple sub-bands further indicates an interlace periodicity of the resource.

In a fifteenth aspect, alone or in combination with one or more of the first through fourteenth aspects, the UE may drop one or more resource blocks of the resource when an interlace configuration of the multiple sub-bands is associated with fewer resource blocks than are included in the resource.

In a sixteenth aspect, alone or in combination with one or more of the first through fifteenth aspects, the multiple sub-bands include any combination of sub-bands of a bandwidth part of the UE.

In a seventeenth aspect, alone or in combination with one or more of the first through sixteenth aspects, the multiple sub-bands include a subset of combinations of sub-bands of a bandwidth part of the UE.

In an eighteenth aspect, alone or in combination with one or more of the first through seventeenth aspects, the multiple sub-bands can include any combination of contiguous sub-bands of a bandwidth part of the UE.

In a nineteenth aspect, alone or in combination with one or more of the first through eighteenth aspects, the multiple sub-bands are configured to include a particular number of sub-bands identified from a set of quantities of sub-bands.

In a twentieth aspect, alone or in combination with one or more of the first through nineteenth aspects, the fixed resource is associated with a fixed frequency location.

In a twenty-first aspect, alone or in combination with one or more of the first through twentieth aspects, the floating resource is associated with a fixed bandwidth and a variable frequency location.

In a twenty-second aspect, alone or in combination with one or more of the first through twenty-first aspects, the adaptive resource is associated with a variable bandwidth and a variable frequency location.

In a twenty-third aspect, alone or in combination with one or more of the first through twenty-second aspects, when the uplink control channel is a dynamically scheduled uplink control channel, the control channel resource configuration includes configuration information for multiple, different resources, wherein identifying the resource is based at least in part on information indicating that the resource is to be used for the uplink control channel.

In a twenty-fourth aspect, alone or in combination with one or more of the first through twenty-third aspects, the multiple, different resources correspond to different sub-bands or different bandwidths for the uplink control channel.

In a twenty-fifth aspect, alone or in combination with one or more of the first through twenty-fourth aspects, identifying the resource further comprises identifying at least one of a time resource or a frequency resource for the uplink control channel.

In a twenty-sixth aspect, alone or in combination with one or more of the first through twenty-fifth aspects, the control channel resource configuration is common to multiple resources.

In a twenty-seventh aspect, alone or in combination with one or more of the first through twenty-sixth aspects, the control channel resource configuration is specific to the resource.

In a twenty-eighth aspect, alone or in combination with one or more of the first through twenty-seventh aspects, the control channel resource configuration is determined based at least in part on at least one of: downlink control information, or an outcome of a listen-before-talk procedure.

In a twenty-ninth aspect, alone or in combination with one or more of the first through twenty-eighth aspects, identifying the resource further comprises identifying a sub-band, of a plurality of sub-bands, on which to transmit the uplink control channel.

In a thirtieth aspect, alone or in combination with one or more of the first through twenty-ninth aspects, the uplink control channel spans multiple sub-bands. In some aspects, the sub-band is a starting sub-band for the uplink control channel.

In a thirty-first aspect, alone or in combination with one or more of the first through thirtieth aspects, the plurality of sub-bands are identified by a sub-band usage bitmap. In some aspects, the resource is identified based at least in part on a mapping between the sub-band usage bitmap and the resource.

In a thirty-second aspect, alone or in combination with one or more of the first through thirty-first aspects, the sub-band usage bitmap is one of a plurality of sub-band usage bitmaps mapped to the resource.

In a thirty-third aspect, alone or in combination with one or more of the first through thirty-second aspects, identifying the resource further comprises identifying multiple sub-bands, of a plurality of sub-bands, on which to transmit the uplink control channel.

In a thirty-fourth aspect, alone or in combination with one or more of the first through thirty-third aspects, the multiple sub-bands are identified based at least in part on a contiguous sub-band configuration of the UE.

In a thirty-fifth aspect, alone or in combination with one or more of the first through thirty-fourth aspects, identifying the resource further comprises: identifying the resource based at least in part on a channel occupancy time (COT) structure indicator that indicates one or more sub-bands available for the resource.

In a thirty-sixth aspect, alone or in combination with one or more of the first through thirty fifth aspects, identifying the resource further comprises identifying the resource based at least in part on an indication, received from a base station, of a sub-band to be used to transmit the uplink control channel.

In a thirty-seventh aspect, alone or in combination with one or more of the first through thirty-sixth aspects, the UE may identify a number of sub-bands to use for the uplink control channel.

In a thirty-eighth aspect, alone or in combination with one or more of the first through thirty-seventh aspects, when the uplink control channel is to be transmitted outside of a COT of a base station associated with the UE and the control channel resource configuration indicates that the resource is an adaptive resource or a floating resource, the resource is identified as the fixed resource.

In a thirty-ninth aspect, alone or in combination with one or more of the first through thirty-eighth aspects, the UE may selectively treat the resource as the fixed resource, the adaptive resource, or the floating resource based at least in part on a listen-before-talk procedure of the UE.

In a fortieth aspect, alone or in combination with one or more of the first through thirty-ninth aspects, the control channel resource configuration is used for uplink control information associated with channel state information and for uplink control information associated with an acknowledgment.

In a forty-first aspect, alone or in combination with one or more of the first through fortieth aspects, the control channel resource configuration is used for uplink control information associated with channel state information and for uplink control information associated with an acknowledgment.

In some aspects, a UE for wireless communication may include memory and one or more processors operatively coupled to the memory. The memory and the one or more processors may be configured to identify a control channel resource configuration associated with an unlicensed spectrum, wherein the control channel resource configuration is associated with an indication of whether a resource to be used for an uplink control channel in the unlicensed spectrum is a fixed resource, a floating resource, or an adaptive resource; identify the resource based at least in part on the control channel resource configuration; and transmit uplink control information on the identified resource.

In some aspects, a non-transitory computer-readable medium may store one or more instructions for wireless communication. The one or more instructions, when executed by one or more processors of a UE, may cause the one or more processors to: identify a control channel resource configuration associated with an unlicensed spectrum, wherein the control channel resource configuration is associated with an indication of whether a resource to be used for an uplink control channel in the unlicensed spectrum is a fixed resource, a floating resource, or an adaptive resource; identify the resource based at least in part on the control channel resource configuration; and transmit uplink control information on the identified resource.

In some aspects, an apparatus for wireless communication may include means for identifying a control channel resource configuration associated with an unlicensed spectrum, wherein the control channel resource configuration is associated with an indication of whether a resource to be used for an uplink control channel in the unlicensed spectrum is a fixed resource, a floating resource, or an adaptive resource; means for identifying the resource based at least in part on the control channel resource configuration; and means for transmitting uplink control information on the identified resource.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
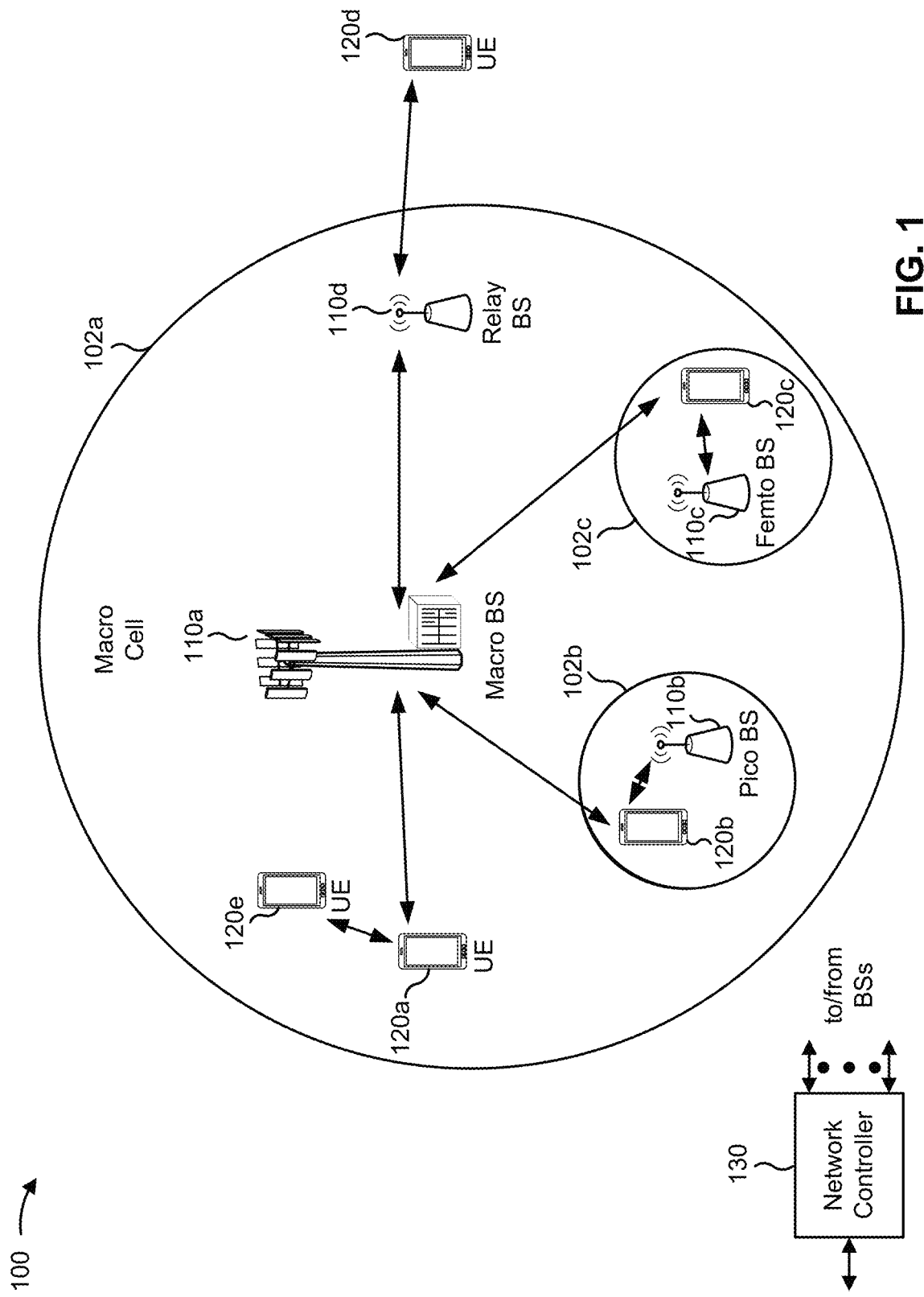
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
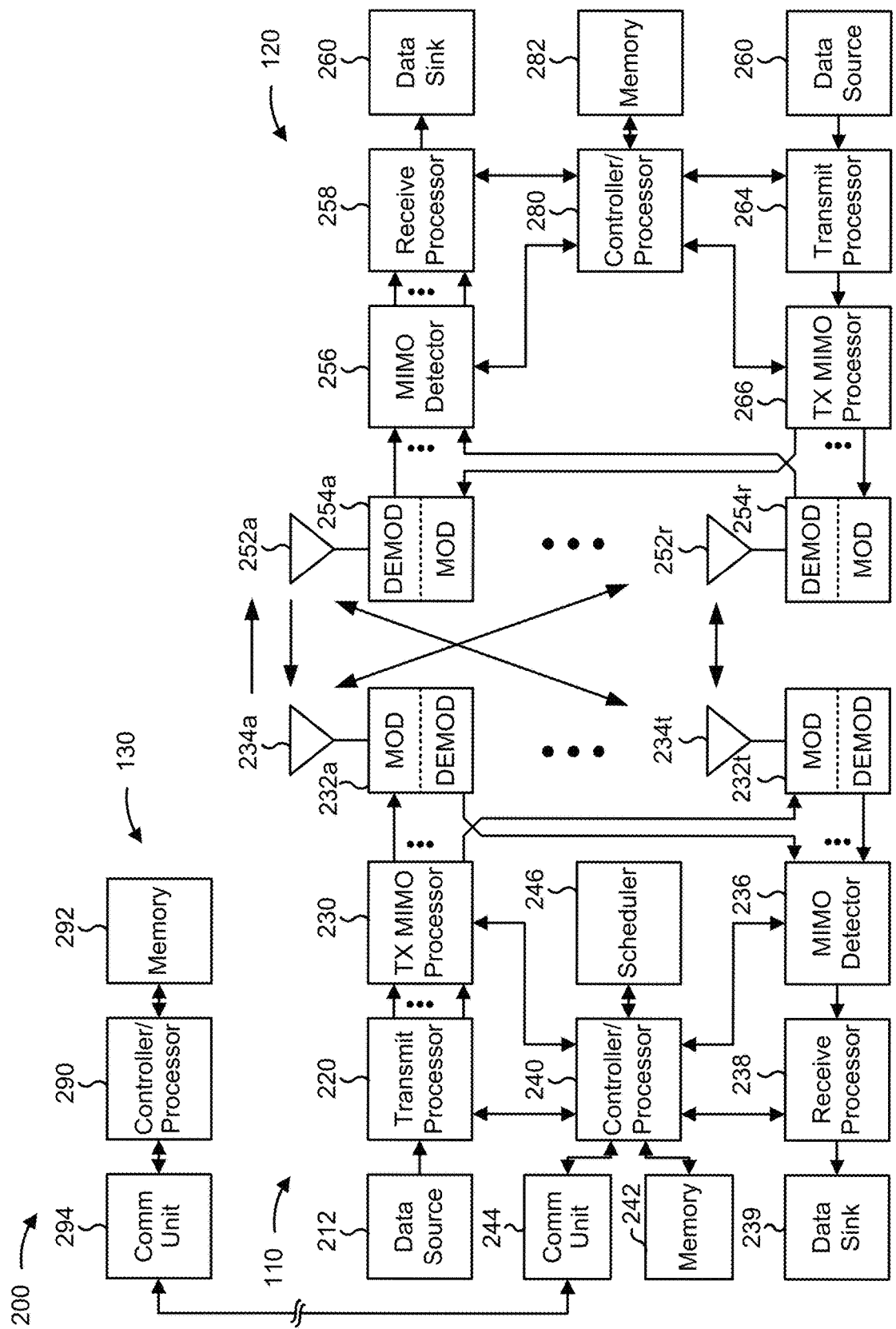
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with adaptive sub-band usage for unlicensed spectrum, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8 and/or other processes as described herein. A scheduler 246 may schedule UEs for data transmission on the downlink and/or uplink.

In some aspects, UE 120 may include means for identifying a control channel resource configuration associated with an unlicensed spectrum; means for identifying the resource based at least in part on the control channel resource configuration; means for identifying the resource based at least in part on the sub-band being identified by a configured list of sub-bands; means for identifying the resource based at least in part on a mapping of resources and corresponding sub-bands and based at least in part on an indication, in the control channel resource configuration, indicating which resource is to be used; means for identifying an interlace configuration for the uplink control channel from a plurality of interlace configurations associated with a set of sub-bands; means for determining a periodicity of the resource blocks based at least in part on the number of the resource blocks and identities of the multiple sub-bands; means for dropping one or more resource blocks of the resource when an interlace configuration of the multiple sub-bands is associated with fewer resource blocks than are included in the resource; means for identifying at least one of a time resource or a frequency resource for the uplink control channel; means for identifying a sub-band, of a plurality of sub-bands, on which to transmit the uplink control channel; means for identifying multiple sub-bands, of a plurality of sub-bands, on which to transmit the uplink control channel; means for identifying the resource based at least in part on a channel occupancy time (COT) structure indicator that indicates one or more sub-bands available for the resource; means for identifying the resource based at least in part on an indication, received from a base station, of a sub-band to be used to transmit the uplink control channel; means for identifying a number of sub-bands to use for the uplink control channel; means for selectively treating the resource as the fixed resource, the adaptive resource, or the floating resource based at least in part on a listen-before-talk procedure of the UE; means for transmitting uplink control information on the identified resource; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Some radio access technologies (RATs), such as NR, may allow operation in the unlicensed spectrum. The NR RAT for the unlicensed spectrum may be referred to as NR-Unlicensed (NR-U or NRU). NR-U may support different bandwidths for sub-bands on which a physical uplink control channel (PUCCH) may be transmitted, such as 20 MHz, 40 MHz, 60 MHz, 80 MHz, and/or the like. The PUCCH may carry various uplink control information (UCI) for a UE, such as channel state information, a scheduling request, an acknowledgment (ACK) or negative ACK (NACK), and/or the like.

The UE may transmit the PUCCH using a PUCCH resource, which may be identified from a PUCCH resource set. A PUCCH resource configuration for a PUCCH resource set may be indicated, for example, in a system information block (SIB) (e.g., SIB1 and/or the like), a radio resource control (RRC) message, and/or the like. The PUCCH resource set may include information identifying a PUCCH format (e.g., a long format, a short format, and/or the like), a starting symbol of the PUCCH, a number of symbols of the PUCCH, a starting physical resource block (PRB) of the PUCCH, a number of PRBs of the PUCCH, and/or the like. A PUCCH resource indicator (PRI) in downlink control information (DCI) 1_0 or DCI 1_1 may indicate which PUCCH resource, of the PUCCH resource set, is to be used for the PUCCH. In some aspects, the PUCCH resource configuration may include an interlace index, which may indicate an interlace configuration for resource blocks to be transmitted on the identified resource.

The UE may be allocated a resource on a sub-band for transmission of the PUCCH. For example, in an unlicensed spectrum, a base station may perform a listen-before-talk (LBT) procedure, and may reserve one or more sub-bands on which the LBT procedure is successful for transmission by one or more UEs associated with the base station. The base station may provide information identifying the one or more sub-bands to the one or more UEs as a channel occupancy time (COT) structure indicator (SI) (COT-SI). The COT-SI may be common to UEs covered by the base station.

The UE may prepare the PUCCH for transmission on one or more of the allocated sub-bands. However, in some cases, the bandwidth used for a PUCCH transmission or the sub-band used for a PUCCH transmission may change over time. For example, the physical downlink shared channel (PDSCH) that schedules a PUCCH or that is associated with a PUCCH may be on a different bandwidth or a different sub-band than the UE. As another example, the PDSCH may be associated with a different COT than the PUCCH. This may be due to unavailability of the original sub-band and/or the like. A fixed scheduling system for the PUCCH may lack the ability to adapt to changing sub-band or bandwidth availability. Thus, the UE and/or the base station may benefit from increased flexibility for configuration of the PUCCH. Furthermore, providing fixed PUCCH resource configurations that can provide for the many possible outcomes of sub-band and bandwidth availability may be prohibitively resource intensive.

Some techniques and apparatuses described herein provide flexible configuration of a PUCCH resource configuration so that a UE can adapt to changing sub-band or bandwidth availability in unlicensed spectrum. For example, some techniques and apparatuses described herein may provide signaling of whether a PUCCH resource configuration should use a fixed resource (e.g., associated with a fixed bandwidth and a fixed sub-band), a floating resource (e.g., associated with a fixed bandwidth and a sub-band that can be selected dynamically or that can be changed), or an adaptive resource (e.g., associated with a bandwidth that can change and a sub-band that can be selected dynamically or that can be changed). Furthermore, some techniques and apparatuses described herein may provide, for a PUCCH resource configuration with a fixed bandwidth and a floating sub-band (e.g., a floating resource), a method for identifying a resource for the PUCCH based at least in part on a configured list of sub-bands with a ranked order.

Some techniques and apparatuses described herein may provide for mapping of a floating or adaptive PUCCH resource configuration to a fixed resource when the floating or adaptive PUCCH resource configuration occurs outside of a COT of the UE or the base station, which may reduce a blind decoding burden at the base station.

Even further, the usage of the adaptive or floating PUCCH resource configuration may allow for mapping of a PUCCH resource to any of a plurality of sub-bands or bandwidths without having to define different PUCCH resource configurations for each sub-band or bandwidth combination, thereby conserving resources of the base station and/or the UE that would otherwise be used to provide and/or store information identifying such a mapping.

Thus, flexibility of scheduling and resource identification in the unlicensed spectrum for the PUCCH is increased, which improves efficiency of PUCCH transmission and configuration, and which reduces the amount of signaling required between the base station and the UE.

Figure 3:
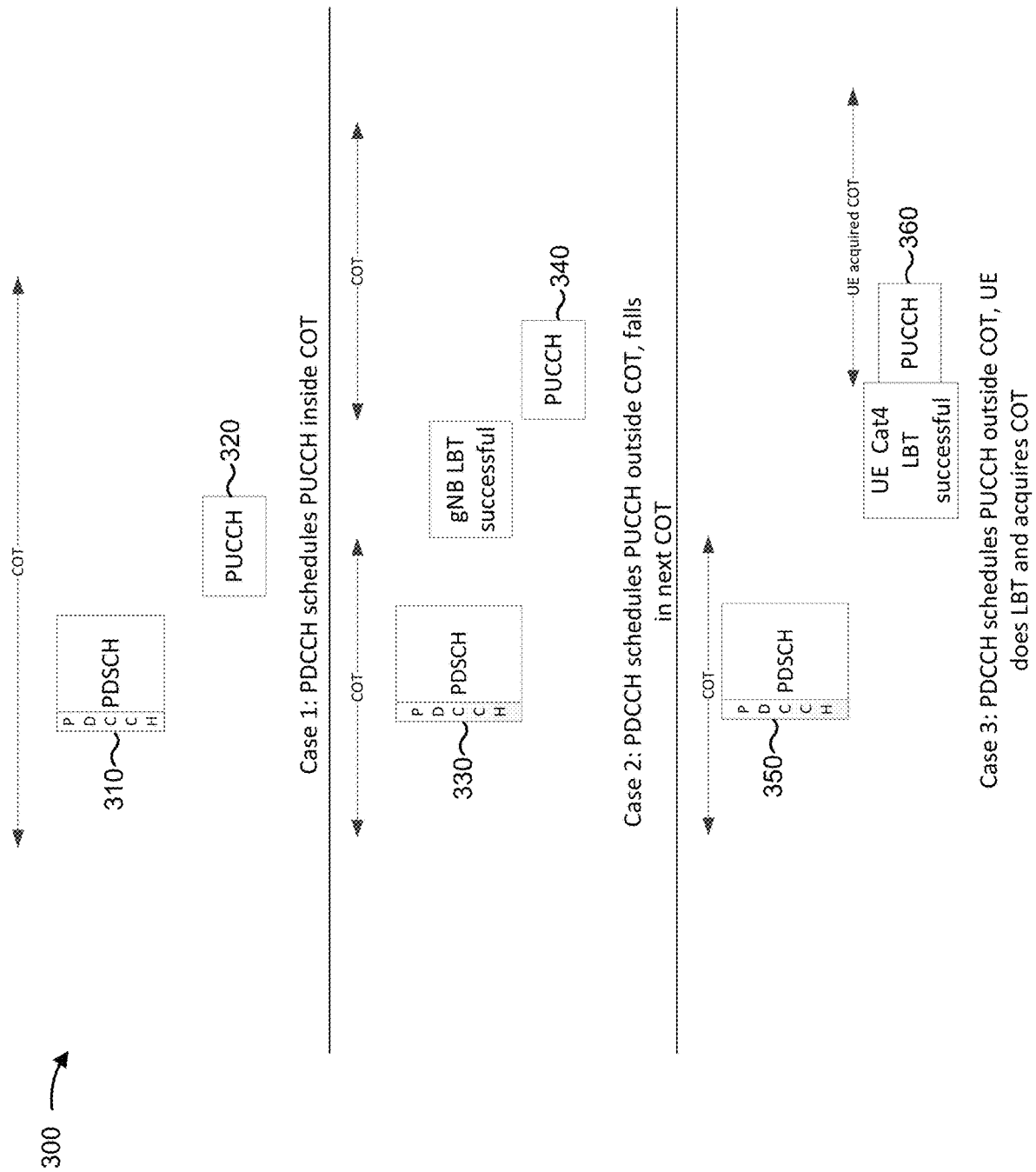
FIG. 3 is a diagram illustrating examples of physical uplink control channel (PUCCH) scheduling relative to channel occupancy times (COTs), in accordance with various aspects of the present disclosure.

FIG. 3 is a diagram illustrating examples 300 of PUCCH scheduling relative to COTs, in accordance with various aspects of the present disclosure. As shown, FIG. 3 includes a Case 1, a Case 2, and a Case 3, which are described in turn below.

In Case 1, a physical downlink control channel (PDCCH) 310, transmitted from a base station to a UE, schedules a PUCCH 320 within a same COT as the PDCCH 310. This case may be straightforward since the base station has reserved the COT for transmissions by the UE. For example, the base station may provide a COT-SI identifying the COT, and the UE may transmit the PUCCH in the COT.

In Case 2, a PDCCH 330, transmitted from the base station to the UE, schedules a PUCCH 340 outside of the COT. In this case, the base station successfully performs an LBT procedure to reserve a second COT, and the UE transmits the PUCCH 340 in the second COT.

In Case 3, a PDCCH 350 schedules a PUCCH 360 outside of the COT. In this case, the UE performs an LBT procedure (e.g., a Category 4 LBT procedure and/or the like) to reserve a UE-acquired COT, and transmits the PUCCH 360 in the UE-acquired COT.

In Case 2 and Case 3, the bandwidth used for the PUCCH and/or the sub-band on which the LBT procedure is successful may be different than the bandwidth and/or the sub-band used for the PDCCH. It may be resource-intensive and/or inefficient to provide different PUCCH resource configurations for each possible bandwidth and/or sub-band on which the PUCCH can be transmitted. By providing adaptive and/or floating PUCCH resource configurations (e.g., based at least in part on which a floating and/or adaptive PUCCH resource can be identified), techniques and apparatuses described herein reduce signaling overhead and improve utilization of unlicensed spectrum.

As indicated above, FIG. 3 is provided as an example. Other examples may differ from what is described with respect to FIG. 3.

Figure 4:
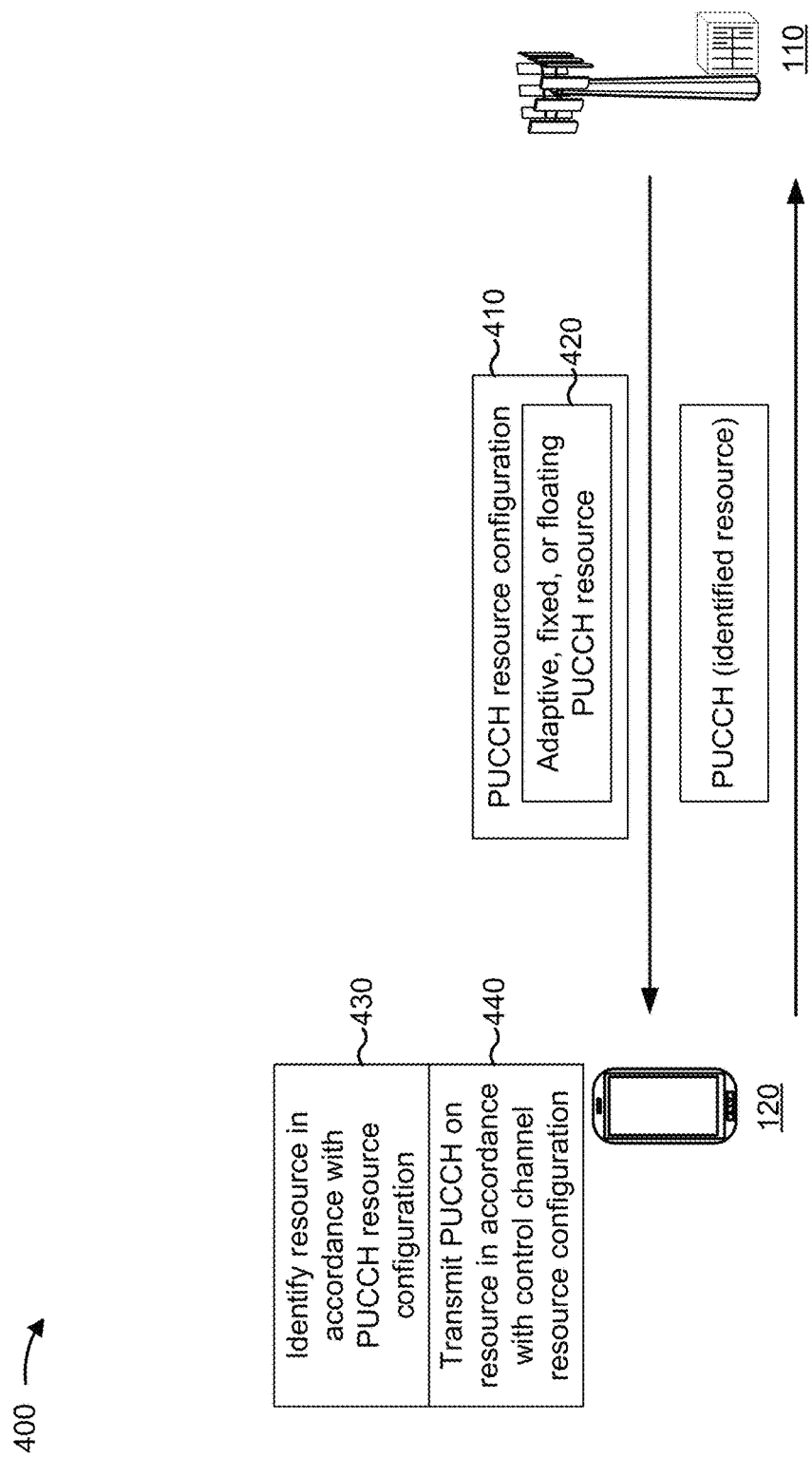
FIG. 4 is a diagram illustrating an example of adaptive or floating PUCCH resource configuration and transmission of a PUCCH in accordance with the PUCCH resource configuration, in accordance with various aspects of the present disclosure.

FIG. 4 is a diagram illustrating an example 400 of adaptive or floating PUCCH resource configuration and transmission of a PUCCH in accordance with the PUCCH resource configuration, in accordance with various aspects of the present disclosure. As shown, example 400 includes a BS 110 and a UE 120.

As shown by reference number 410, the BS 110 may provide a PUCCH resource configuration to the UE 120. The PUCCH resource configuration may include information indicating a resource configuration for a PUCCH, such as a PUCCH format, a starting symbol of the PUCCH, a number of symbols of the PUCCH, a starting PRB of the PUCCH, a number of PRBs of the PUCCH, and/or the like. In some aspects, the BS 110 may provide multiple PUCCH resource configurations, as described in more detail elsewhere herein.

As shown by reference number 420, the PUCCH resource configuration may include an indication of whether the PUCCH resource configuration is associated with an adaptive resource, a fixed resource, or a floating resource. While the PUCCH resource configuration is shown as including the indication, in some aspects, the indication may be associated with the PUCCH resource configuration or separate from the PUCCH resource configuration. In some aspects, the indication may indicate a resource type of the PUCCH resource configuration, such as whether the PUCCH resource configuration is associated with a fixed bandwidth or an adaptive bandwidth. In some aspects, the indication may be part of a PUCCH resource indicator field and/or the like.

A fixed resource may be associated with a fixed frequency location (e.g., a fixed sub-band, a fixed number of resource blocks, a fixed interlace configuration, and/or the like) and a fixed bandwidth. A floating resource may be associated with a substantially fixed bandwidth (e.g., in terms of a number of sub-bands spanned by the corresponding PUCCH) and a variable frequency location (e.g., a variable sub-band, a variable interlace configuration, and/or the like). An adaptive resource may be associated with a variable bandwidth and/or a variable frequency location. For example, if the UE 120 has N sub-bands, a PUCCH resource determined in accordance with an adaptive PUCCH resource configuration may span from 1 to N sub-bands, whereas a PUCCH resource determined in accordance with a fixed or floating PUCCH resource configuration may span the number of sub-bands indicated by the PUCCH configuration.

In some aspects, the resource type of the PUCCH resource configuration may be signaled during radio resource control (RRC) configuration of the UE 120. In some aspects, the resource type can be common to all PUCCH resource configurations, which may enable the BS 110 to configure each UE 120 with a respective fixed bandwidth and/or sub-band using fixed resource types. In some aspects, the resource type may be specific to a PUCCH resource configuration, which may enable the BS 110 to schedule some PUCCHs with fixed resources and some PUCCHs that can be adapted based at least in part on an outcome of an LBT procedure of the BS 110 and/or the UE 120. In some aspects, the UE 120 may identify the resource type dynamically. For example, the UE 120 may receive DCI that indicates the resource type (e.g., as part of the PUCCH resource configuration, after the PUCCH resource configuration is received, and/or the like), may determine the resource type based at least in part on an outcome of an LBT procedure, and/or the like. The dynamic identification of the resource type may allow for reconfiguration of the resource type (e.g., based at least in part on changing channel conditions, LBT outcomes, and/or the like).

In some aspects, the UE 120 may be configured with multiple PUCCH resource configurations. In such a case, for a dynamically scheduled PUCCH, a PUCCH resource indicator (e.g., provided using DCI) may be used to indicate which PUCCH resource configuration is to be used. Thus, the PUCCH size (e.g., number of symbols, number of resource blocks, bandwidth, and/or the like) may be adapted for channel conditions, payload size, and/or the like.

As shown by reference number 430, the UE 120 may identify a resource on which to transmit the PUCCH based at least in part on the PUCCH resource configuration, and, as shown by reference number 440, the UE 120 may transmit uplink control information (UCI) on the PUCCH using the identified resource. For example, the UE 120 may select a sub-band on which to transmit the PUCCH, a bandwidth to be used for transmission of the PUCCH, a resource for transmission of the PUCCH, an interlace configuration to be used to transmit the PUCCH, and/or the like. In some aspects, the UE 120 may select a sub-band from a set of sub-bands reserved by the BS 110. For example, the UE 120 may identify the set of sub-bands reserved by the BS 110, and may select one or more sub-bands from the set of sub-bands. In some aspects, the UE 120 may receive information indicating which sub-band is to be selected. For example, the UE 120 may select a sub-band based at least in part on an indication from the BS 110 that the UE 120 is to select the sub-band.

In some aspects, the UE 120 may not support changing a resource from a sub-band identified by the PUCCH configuration information. In other words, the UE 120 may not support adaptive or floating PUCCH resources. In this case, the PUCCH may use the fixed resource configured by the PUCCH resource configuration. The BS 110 may handle scheduling issues that arise in this case. For example, in the case that a PUCCH is to be transmitted on a different sub-band than one configured by the PUCCH configuration information, the BS 110 may schedule a physical uplink shared channel (PUSCH) with no data on the different sub-band.

In some aspects, the UE 120 may identify resources for a wideband PUCCH (e.g., spanning multiple LBT sub-bands), which may prevent issues with other nodes securing resources that are to be used for the wideband PUCCH before the wideband PUCCH is transmitted. In some aspects, the UE 120 may select two or more sub-bands from a plurality of sub-bands reserved by the BS 110 for the PUCCH. In a first example, the UE 120 may be permitted to select any sub-band combination of the plurality of sub-bands. In a second example, the UE 120 may be permitted to select a subset (e.g., a proper subset) of sub-band combinations of the plurality of sub-bands. In a third example, the UE 120 may be permitted to select a sub-band combination only of contiguous sub-bands. In some aspects, the UE 120 may be permitted to select a number of sub-bands, from a set of quantities of sub-bands. For example, the UE 120 may be permitted to be select only 1 or 2 sub-bands, only 1, 2, or 4 sub-bands, and/or the like. For further description of wideband PUCCH resource selection, refer to FIG. 5, described below.

In some aspects, the UE 120 may not support a wideband PUCCH. For example, the PUCCH may span only one LBT sub-band. In this case, the BS 110 may handle scheduling issues. For example, the BS 110 may schedule a PUSCH with no data if the need arises to transmit a wideband PUCCH.

In some aspects, the UE 120 may determine an interlace configuration for a resource or a PUCCH. An interlace configuration may identify a spacing, in frequency, of resource blocks used to transmit the PUCCH. For example, the interlace configuration may ensure that minimum channel occupancy requirements are satisfied for the sub-band or sub-bands on which the PUCCH is transmitted. In some aspects, the UE 120 may select an interlace configuration for the PUCCH from a plurality of interlace configurations associated with a set of sub-bands reserved by the BS 110 (e.g., randomly, pseudo-randomly, based at least in part on the PUCCH resource configuration or another indication received from the BS 110, and/or the like).

In some aspects, the UE 120 may determine a number of resource blocks to be used for an interlace configuration. For example, the set of sub-bands may be associated with different interlace configurations that have different quantities of resource blocks. In some aspects, the PUCCH may use a smallest number of resource blocks of the interlace configurations. For example, the UE 120 may not use one or more resource blocks of the selected interface configuration if the interface configuration is associated with more resource blocks than the smallest number of resource blocks, which may improve uniformity of the PUCCH. In some aspects, the PUCCH may use all resource blocks of the allocated interlace configuration, which may improve resource utilization relative to using the smallest number of RBs of the interlace configurations.

In some aspects, an interlace configuration may span a single sub-band or may span multiple sub-bands. For a more detailed description of determining an interlace configuration for the resource, such as for a wideband PUCCH, refer to FIG. 5, described below. In some aspects, the UE 120 may determine the interlace configuration based at least in part on the PUCCH resource configuration, DCI associated with the PUCCH resource configuration, and/or the like.

In some aspects, the UE 120 may identify a resource for a PUCCH outside of a COT of the BS 110 (e.g., Case 3 of FIG. 3). For example, the UE 120 may perform a Category 4 LBT procedure and may identify a resource outside of the COT used to configure the PUCCH. In this case, the UE 120 may identify a resource within a fixed bandwidth and a fixed sub-band, which may enable the BS 110 to blind detect the PUCCH within the fixed sub-band, thereby conserving resources of the BS 110. In such a case, the UE 120 may be configured with a floating resource or an adaptive resource, and may selectively use the floating resource or the adaptive resource, or the fixed resource, based at least in part on whether the LBT procedure identifies a resource outside of the COT used to configured the PUCCH (e.g., may selectively treat the resource as the fixed resource, the adaptive resource, or the floating resource based at least in part on an LBT procedure of the UE).

In some aspects, the BS 110 may acquire another COT for the PUCCH (e.g., Case 2 of FIG. 3). In this case, the resource for the PUCCH may be defined as a floating resource or an adaptive resource. The UE 120 may selectively map the floating resource or the adaptive resource to a fixed resource based at least in part on a rule. For example, if the resource for the PUCCH is outside of the COT used to configure the PUCCH, then the UE 120 may map the PUCCH to the fixed resource (e.g., may selectively treat the resource as the fixed resource, the adaptive resource, or the floating resource based at least in part on an LBT procedure of the UE). In some aspects, all UEs 120 covered by a BS 110 may be configured to map the PUCCH to a sub-band. For example, the UEs 120 may be configured with a common sub-band priority order for mapping the PUCCHs to the fixed sub-band (e.g., based at least in part on which sub-bands have been reserved by the BS 110 as part of the LBT operation). In some aspects, two or more UEs 120 may be configured with different sub-band priority orders, and may map respective PUCCHs to sub-bands based at least in part on the different sub-band priority orders (e.g., based at least in part on which sub-bands have been reserved by the BS 110 as part of the LBT operation).

As indicated above, FIG. 4 is provided as one or more examples. Other examples may differ from what is provided in connection with FIG. 4.

Figure 5:
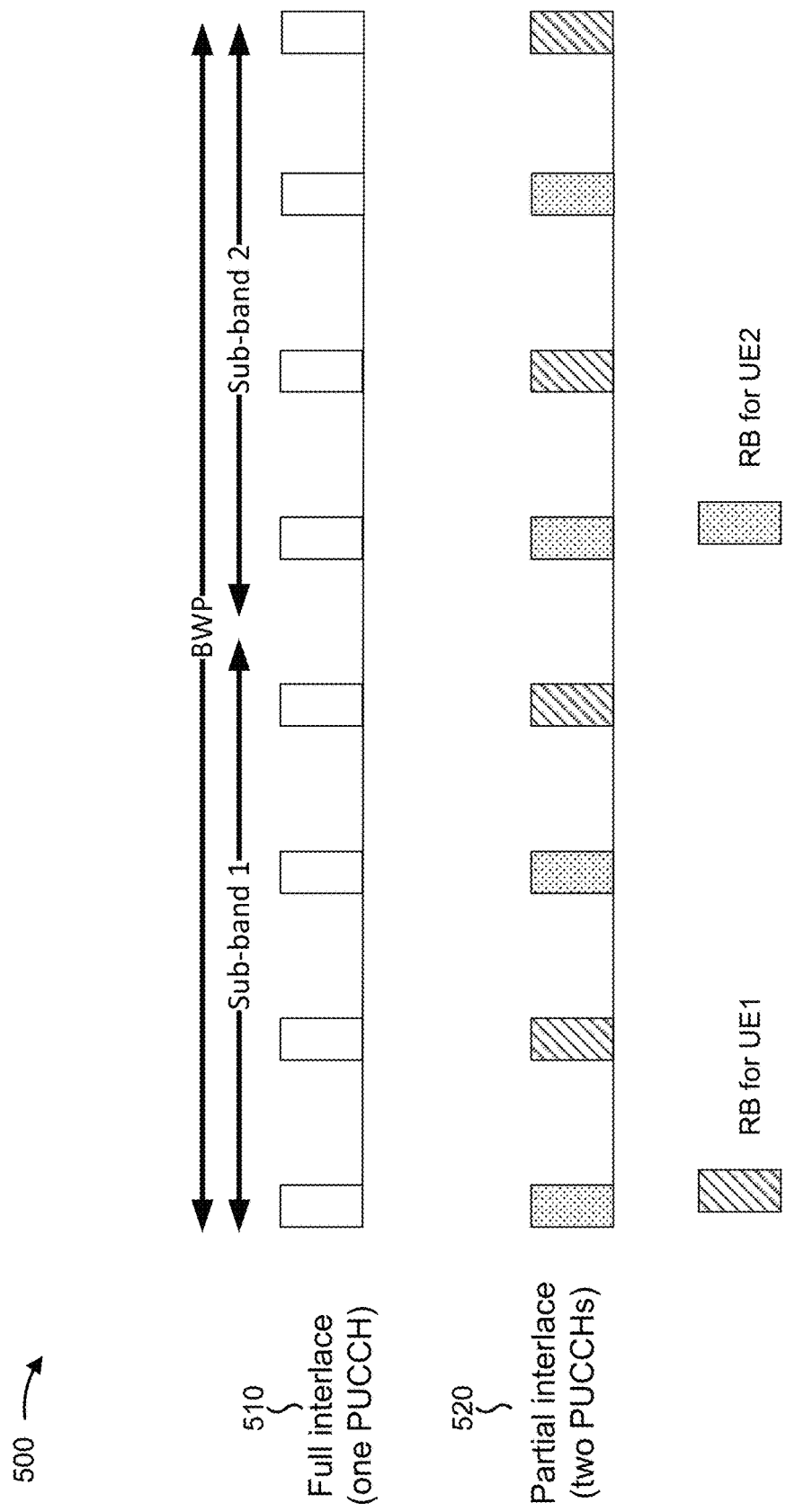
FIG. 5 is a diagram illustrating an example of interlace configurations for a wideband PUCCH resource configuration, in accordance with various aspects of the present disclosure.

FIG. 5 is a diagram illustrating an example 500 of interlace configurations for a wideband PUCCH resource configuration, in accordance with various aspects of the present disclosure. In example 500, each sub-band, of Sub-band 1 and Sub-band 2, includes 4 interlaced resource blocks.

In some aspects, a UE (e.g., UE 120) may identify a wideband resource for a PUCCH to be transmitted by the UE based at least in part on a PUCCH resource configuration. As used herein, a set of time and/or frequency domain resources that spans two or more sub-bands may be referred to as a wideband resource. The usage of the wideband PUCCH may reduce PUCCH latency and/or improve resource utilization.

In some aspects, the UE 120 may use a fully interlaced PUCCH. As used herein, a PUCCH that includes a number of resource blocks proportionate to the number of sub-bands used to transmit the PUCCH may be referred to as a fully interlaced PUCCH. For an example, refer to reference number 510 of FIG. 5. As shown by reference number 510, when a PUCCH is fully interlaced across two sub-bands with four resource blocks each, the PUCCH may include eight resource blocks (shown in FIG. 5 with a white fill).

In some aspects, the UE 120 (and/or one or more other UEs 120) may use a partially interlaced PUCCH. As used herein, a PUCCH that includes a number of resource blocks independent of the number of sub-bands used to transmit the PUCCH may be referred to as a partially interlaced PUCCH. For an example, refer to reference number 520 of FIG. 5. As shown by reference number 520, when a PUCCH is partially interlaced across two sub-bands with four resource blocks each, the PUCCH may include four resource blocks, and may be interleaved with resource blocks of another PUCCH. For example, the PUCCH may use every Xth resource block in the full interlace, given X sub-bands. In some aspects, when an interlace over X sub-bands includes more than N x X resource blocks (where N is the number of resource blocks in one sub-band), the UE 120 may drop one or more resource blocks (e.g., at an edge of the wideband PUCCH).

In some aspects, the UE 120 may use a partial interlace with a configurable number of resource blocks, which may allow the BS 110 to configure whether the UE 120 is to use a full interlace or a partial interlace. For example, the value Q may be the resource block periodicity within an interlace, and may be configurable. Q=1 may correspond to a full interlace, Q=2 may correspond to the partial interlace shown by reference number 520, and so on. In this case, the total number of resource blocks may be limited to a set of N, 2N, 3N, 4N, etc. In some aspects, Q may be configured using RRC signaling, as part of the PUCCH resource configuration, provided in DCI, and/or the like.

In some aspects, when the partial interlace with the configurable number of resource blocks is used, a resource block periodicity and a resource block offset may be provided in an RRC configuration message, in DCI, and/or the like. For example, if Q=2, the resource block offset may be 0 or 1 to indicate whether the corresponding PUCCH is to use odd-indexed or even-indexed resource blocks. In the case when the number of resource blocks is less than the number of resource blocks in the interlace, the UE 120 may drop one or more resource blocks, or the field indicating the number of resource blocks may be removed or not used In some aspects, the resource block periodicity may be determined based at least in part on a number of resource blocks indicated by the PUCCH resource configuration and based at least in part on which sub-band and/or how many sub-bands are used for the PUCCH. For example, consider a 40 MHz bandwidth, a subcarrier spacing of 30 kHz, M=5, and N=21 or 22, wherein M is a number of interlaces. If a UE 0 is allocated Interlace 0 with the number of resource blocks equal to 10, the UE 0 may identify Q=2 as the resource block periodicity.

As indicated above, FIG. 5 is provided as one or more examples. Other examples may differ from what is provided in connection with FIG. 5.

Figure 6:
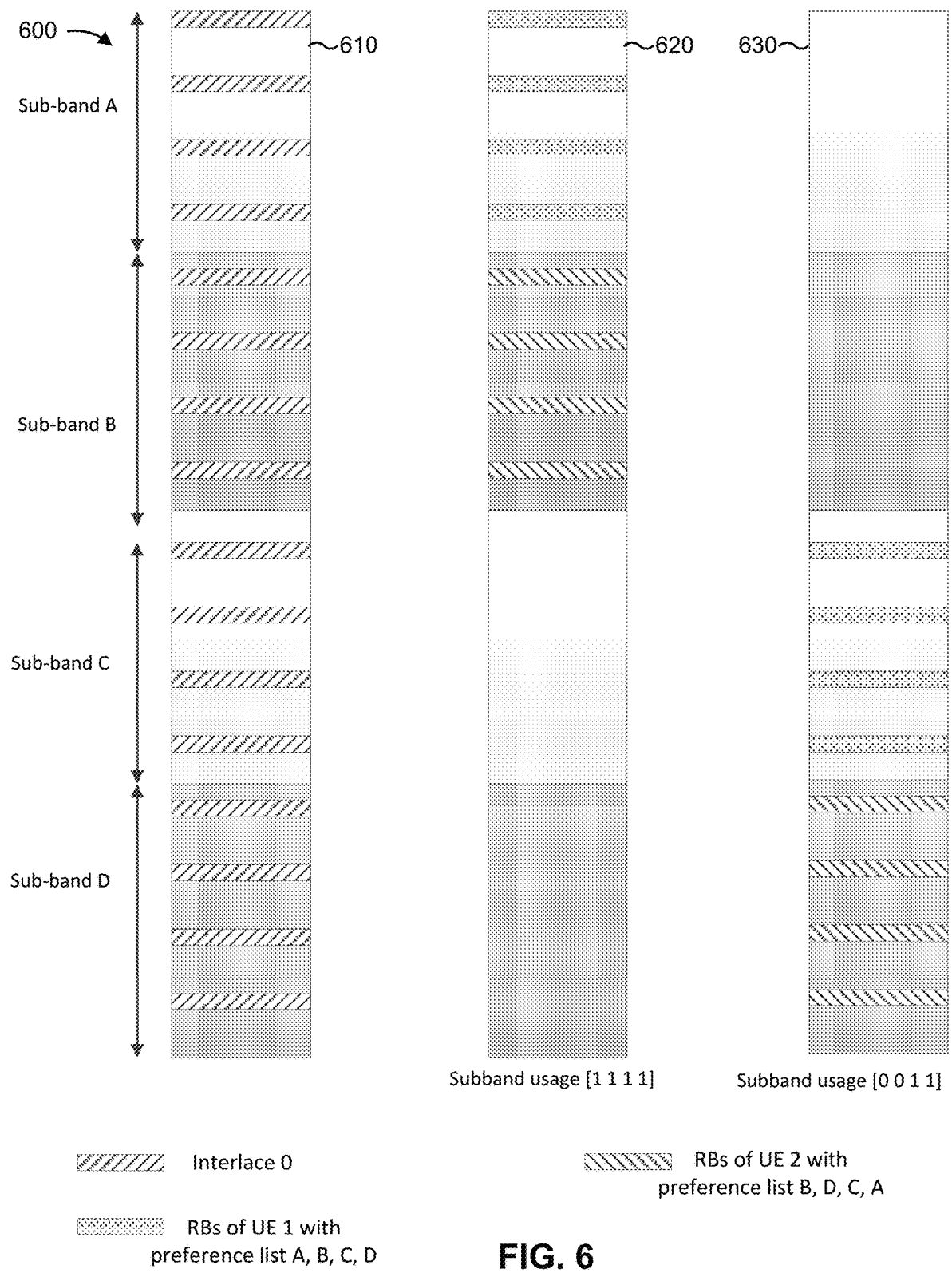
FIG. 6 is a diagram illustrating an example of sub-band selection based at least in part on a priority order of sub-bands associated with a PUCCH resource configuration, in accordance with various aspects of the present disclosure.

FIG. 6 is a diagram illustrating an example 600 of sub-band selection based at least in part on a priority order of sub-bands associated with a PUCCH resource configuration, in accordance with various aspects of the present disclosure. Example 600 illustrates examples of sub-band selection for a plurality of Sub-bands A, B, C, and D. As shown, resource blocks associated with a UE 1 are shown by a dotted fill, and resource blocks associated with a UE 2 are shown by a top-left-to-bottom-right diagonal hatching. As further shown, the UE 1 and the UE 2 are associated with respective configured lists of sub-bands that may identify relative priorities of the plurality of sub-bands. Here, the UE 1 is associated with a configured list of A, B, C, D, and the UE 2 is associated with a configured list of B, D, C, A. The UE 1 and the UE 2 may be configured with the configured lists by the BS and/or the like.

A BS (e.g., BS 110) may indicate which sub-bands are available for a PUCCH using a sub-band usage bitmap. In some aspects, the sub-band usage bitmap may be implemented as another form of indicator, such as an index value and/or the like. The sub-band usage bitmap may include one or more values indicating which sub-bands, of a plurality of sub-bands associated with a UE, are available for a floating or adaptive PUCCH. For example, in example 600, a sub-band usage bitmap of [1 1 1 1] may indicate that all four sub-bands of example 600 are available, whereas a sub-band usage bitmap of [0 0 1 1] may indicate that Sub-Bands C and D are available. The BS 110 may transmit sub-band usage bitmaps in the COT-SI, a group common PDCCH, and/or the like. The interlace on all sub-bands is shown by reference number 610.

As shown by reference number 620, when all four sub-bands are available, the UE 1 may select Sub-band A and the UE 2 may select Sub-band B, because Sub-band A and Sub-band B are associated with a highest priority level for each of the UE 1 and the UE 2 according to the configured lists. As shown by reference number 630, when Sub-bands C and D are available, the UE 1 may select Sub-band C and the UE 2 may select Sub-Band D, because Sub-band D is associated with a higher priority for the UE 2 than Sub-band C, and because Sub-band C is the only remaining sub-band for the UE 1.

In some aspects, a UE may map a floating PUCCH to a single sub-band. For example, the UE may map a floating PUCCH to any one of the available sub-bands. As another example, the UE may map the floating PUCCH based at least in part on a priority order among the available sub-bands (described in connection with example 600). As yet another example, the UE may map a PUCCH based at least in part on a table, such as a lookup table, that may indicate a sub-band to be used for each combination of available sub-bands. As still another example, the UE may map the PUCCH to a sub-band explicitly or implicitly identified by a BS (e.g., in the COT-SI, in the DL/UL grants, and/or the like).

In some aspects, a UE may select a subset of available sub-bands, and may map the PUCCH to one or more of the subset of sub-bands based at least in part on an outcome of an LBT procedure. For example, the subset may include all available sub-bands, may be based at least in part on the configured list of sub-bands (e.g., a highest-priority T sub-bands of the available sub-bands, where T is an integer), may include a subset of available sub-bands that is determined based at least in part on a lookup table or dynamic signaling, and/or the like.

In one or more of the above aspects described in connection with example 600, the UE may not be permitted to transmit the PUCCH if the UE 120 does not detect a COT-SI that identifies the available sub-bands.

In some aspects, the UE may identify a sub-band for a floating PUCCH based at least in part on an explicit or implicit indication of which sub-band is to be identified, as described above. In some aspects, the UE may receive the indication in a COT-SI (e.g., in addition to the sub-band usage bitmap). In some aspects, the UE may receive the indication in a grant, such as a PDSCH grant. For example, a PRI field of the grant may provide the indication. In some aspects, the indication may be based at least in part on a sub-band on which the UE detected the PDCCH or based at least in part on one or more allocated PDSCH sub-bands of the UE. For example, the UE may identify a PDCCH sub-band as the sub-band for the PUCCH. In some aspects, the UE may use a default sub-band as the sub-band for the floating PUCCH (e.g., based at least in part on one of the options described above or based at least in part on a fixed or RRC configured default value). In some aspects, the BS may grant, to the UE, a PUSCH without data so that UCI associated with the PUCCH can be piggy backed on the PUSCH.

The above operations, described in connection with example 600, can also be applied for the selection of multiple sub-bands (e.g., for a wideband PUCCH) or for an adaptive PUCCH. In the case when the UE selects from multiple sub-band combinations, the UE may drop one or more sub-band combinations from consideration. For example, if the UE can use sub-bands 0, 1, and 3, and if the PUCCH is configured to span two contiguous sub-bands, the UE may drop sub-band 3, since sub-band 3 is not contiguous to another sub-band. In this same case, if only sub-bands 0 and 2 are available, the UE may drop the PUCCH. In some aspects, the UE may identify information indicating a number of sub-bands to be used for the wideband PUCCH or the adaptive PUCCH. For example, the information may be explicitly indicated in a group common PDCCH or in a UE-specific PDCCH, may be identified implicitly based at least in part on a largest number of sub-bands indicated as available by the BS, may be identified based at least in part on an outcome of an LBT procedure at the UE when multiple sub-bands are available, and/or the like.

As indicated above, FIG. 6 is provided as an example. Other examples may differ from what is described in connection with FIG. 6.

Figure 7:
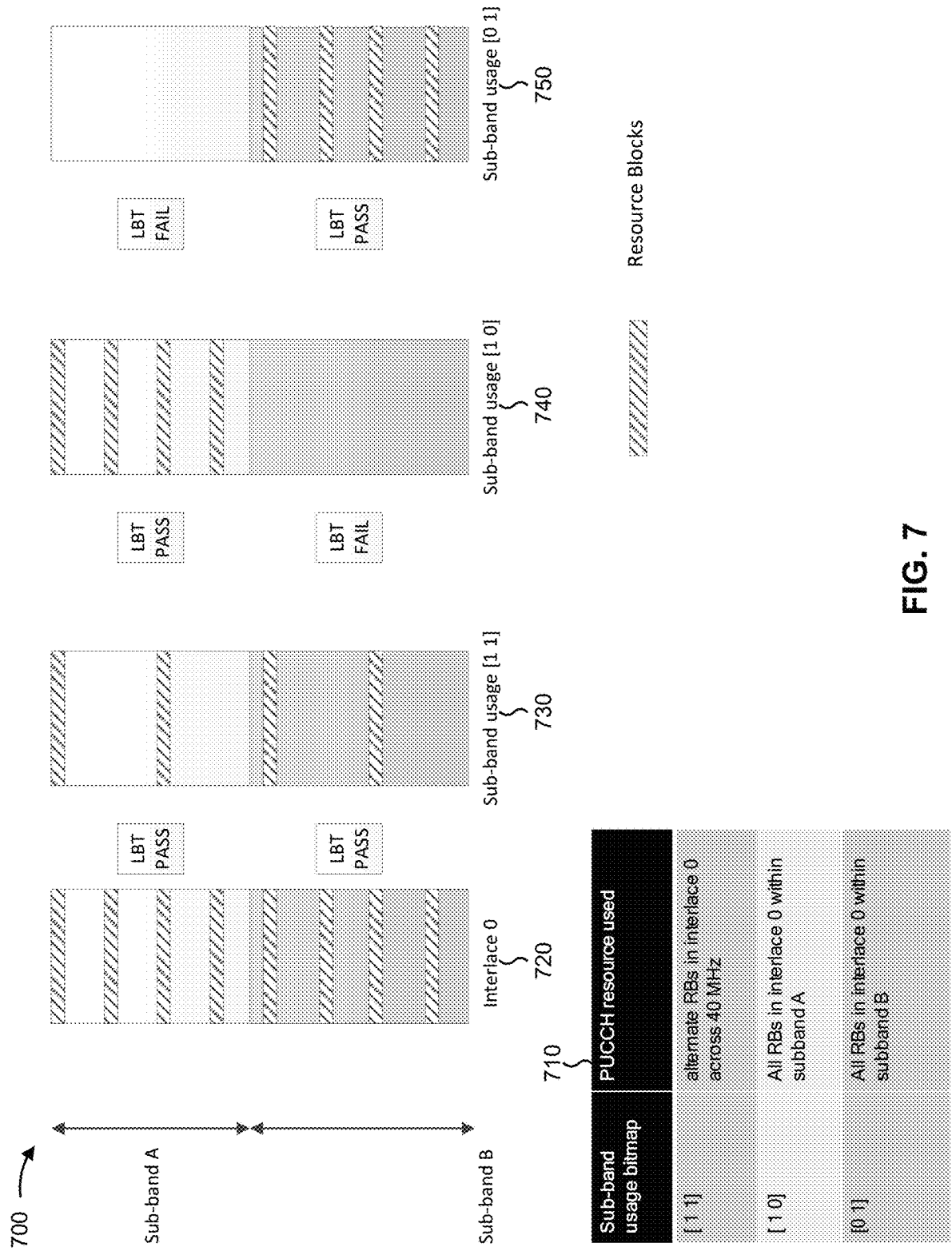
FIG. 7 is a diagram illustrating an example of resource identification in accordance with a table indicating a mapping between sub-band usage bitmaps and PUCCH resources, in accordance with various aspects of the present disclosure.

FIG. 7 is a diagram illustrating an example 700 of resource identification in accordance with a table indicating a mapping between sub-band usage bitmaps and PUCCH resources, in accordance with various aspects of the present disclosure.

As shown in FIG. 7, a table 710 may identify mappings between sub-band usage bitmaps and PUCCH resources relative to an Interlace 0, shown by reference number 720. The first row of the table 710 corresponds to the situation shown by reference number 730, wherein a Sub-band A and a Sub-band B are both available for a PUCCH. In this case, the PUCCH is mapped to alternating resource blocks (RBs) of Interlace 0 across two sub-bands (e.g., 40 MHz). The second row of the table 710 corresponds to the situation shown by reference number 740, wherein only Sub-band A is available for a PUCCH. In this case, the PUCCH is mapped to all RBs of Interlace 0 in Sub-band A. The third row of the table 710 corresponds to the situation shown by reference number 750, wherein only Sub-band B is available for a PUCCH. In this case, the PUCCH is mapped to all RBs of Interlace 0 in Sub-band B. The above illustrates a case where each sub-band usage bitmap corresponds to a PUCCH resource. For example, there may be 15 resource mappings for 4 sub-bands, 3 resource mappings for 2 sub-bands, and so on.

In some aspects, multiple sub-band usage bitmaps may be associated with a single resource. For example, in the above example, sub-band usage bitmaps [1 1] and [1 0] might both map to "All RBs in Interlace 0 within Sub-band A," which may reduce the number of resource mappings, thereby conserving configuration resources.

In some aspects, the UE may select a contiguous subset of sub-bands identified by a sub-band usage bitmap based at least in part on a UE capability. For example, a sub-band usage bitmap may indicate that a BS occupies sub-bands A, B, and D. In that case, the UE may select from the set of sub-bands [A B] or [A B D] depending on capabilities of the UE for non-contiguous transmission, maximum bandwidth, and/or the like.

In some aspects, the techniques and apparatuses described in connection with FIGS. 3-7 may be applied similarly for a PUCCH containing channel state information (CSI) as for a PUCCH containing an ACK, which may simplify implementation and reduce signaling. In some aspects, a PUCCH containing a CSI may use a fixed bandwidth (e.g., a fixed resource or a floating resource), and a PUCCH containing an ACK may use a floating or adaptive resource (e.g., based at least in part on a sub-band usage bitmap), which may provide improved flexibility for the PUCCH containing the ACK and simplify detection of the PUCCH containing the CSI.

As indicated above, FIG. 7 is provided as one or more examples. Other examples may differ from what is described with regard to FIG. 7.

Figure 8:
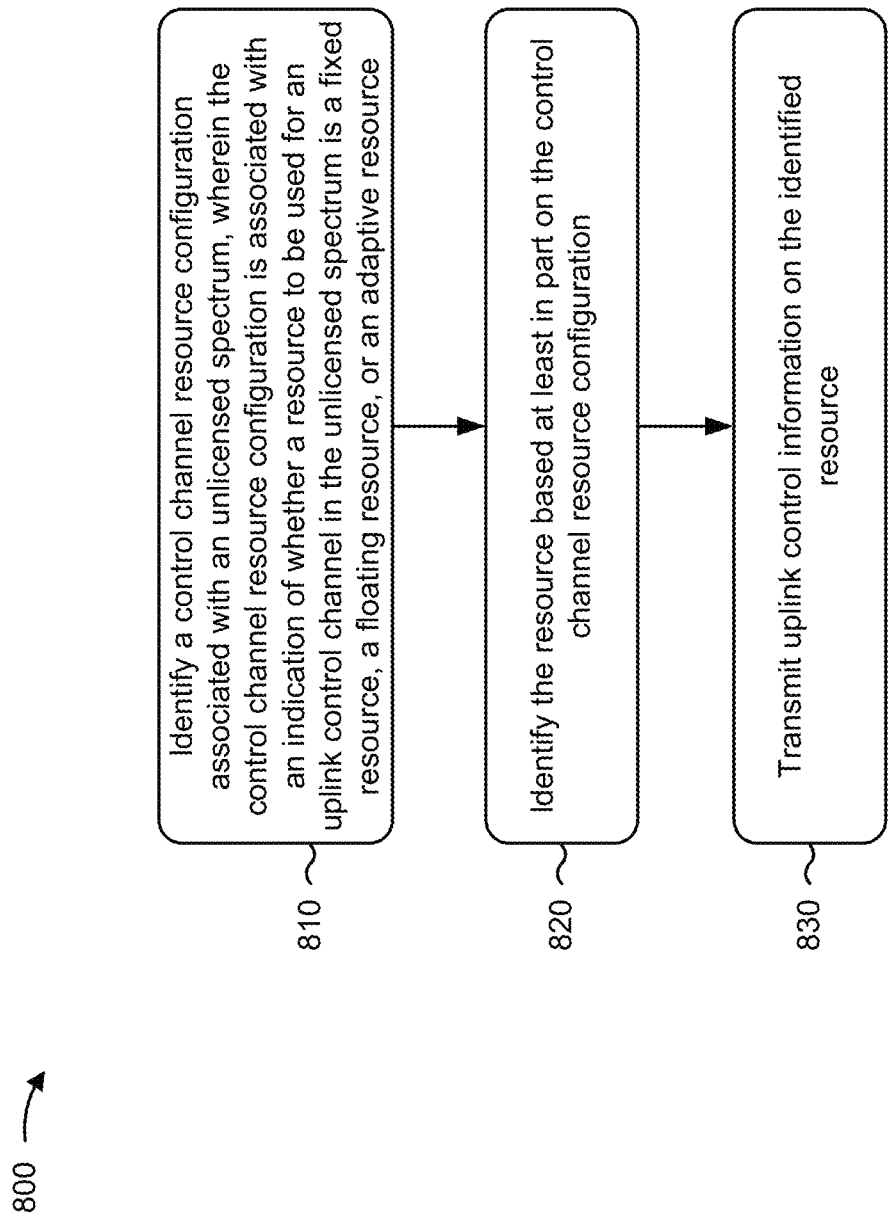
FIG. 8 is a diagram illustrating an example process performed, for example, by a user equipment, in accordance with various aspects of the present disclosure.

FIG. 8 is a diagram illustrating an example process 800 performed, for example, by a user equipment, in accordance with various aspects of the present disclosure. Example process 800 is an example where a UE (e.g., UE 120 and/or the like) performs operations associated with adaptive sub-band usage for an uplink control channel.

As shown in FIG. 8, in some aspects, process 800 may include identifying a control channel resource configuration associated with an unlicensed spectrum, wherein the control channel resource configuration is associated with an indication of whether a resource to be used for an uplink control channel in the unlicensed spectrum is a fixed resource, a floating resource, or an adaptive resource (block 810). For example, the UE (e.g., using antenna 252, DEMOD 254, MIMO detector 256, receive processor 258, controller/processor 280, and/or the like) may identify a control channel resource configuration associated with an unlicensed spectrum, as described above. In some aspects, the control channel resource configuration is associated with an indication of whether a resource to be used for an uplink control channel in the unlicensed spectrum is a fixed resource, a floating resource, or an adaptive resource.

As further shown in FIG. 8, in some aspects, process 800 may include identifying the resource based at least in part on the control channel resource configuration (block 820). For example, the UE (e.g., using antenna 252, DEMOD 254, MIMO detector 256, receive processor 258, controller/processor 280, and/or the like) may identify the resource based at least in part on the control channel resource configuration, as described above.

As further shown in FIG. 8, in some aspects, process 800 may include transmitting uplink control information on the identified resource (block 830). For example, the UE (e.g., using controller/processor 280, transmit processor 264, TX MIMO processor 266, MOD 254, antenna 252, and/or the like) may transmit uplink control information (e.g., on the uplink control channel) on the identified resource, as described above.

Process 800 may include additional aspects, such as any single aspect or any combination of aspects described below and/or in connection with one or more other processes described elsewhere herein.

In a first aspect, identifying the resource is based at least in part on whether a sub-band in which the resource is included is a floating sub-band or a fixed sub-band.

In a second aspect, alone or in combination with the first aspect, when the sub-band is a floating sub-band, identifying the resource further comprises identifying the resource based at least in part on the sub-band being identified by a configured list of sub-bands.

In a third aspect, alone or in combination with one or more of the first and second aspects, when the resource is an adaptive resource, identifying the resource further comprises identifying the resource based at least in part on a mapping of resources and corresponding sub-bands and based at least in part on an indication, in the control channel resource configuration, indicating which resource is to be used.

In a fourth aspect, alone or in combination with one or more of the first through third aspects, identifying the resource further comprises identifying an interlace configuration for the uplink control channel from a plurality of interlace configurations associated with a set of sub-bands.

In a fifth aspect, alone or in combination with one or more of the first through fourth aspects, the interlace configuration uses a smallest number of resource blocks of respective quantities of resource blocks associated with the plurality of interlace configurations.

In a sixth aspect, alone or in combination with one or more of the first through fifth aspects, the uplink control channel uses all resource blocks of the interlace configuration.

In a seventh aspect, alone or in combination with one or more of the first through sixth aspects, the uplink control channel spans a single sub-band.

In an eighth aspect, alone or in combination with one or more of the first through seventh aspects, the uplink control channel spans multiple sub-bands.

In a ninth aspect, alone or in combination with one or more of the first through eighth aspects, a number of resource blocks used for the resource is proportionate to a number of sub-bands included in the multiple sub-bands.

In a tenth aspect, alone or in combination with one or more of the first through ninth aspects, a number of resource blocks used for the resource is independent of a number of sub-bands included in the multiple sub-bands.

In an eleventh aspect, alone or in combination with one or more of the first through tenth aspects, the UE may receive information indicating at least one of a periodicity or an offset of the resource blocks used for the resource.

In a twelfth aspect, alone or in combination with one or more of the first through eleventh aspects, the UE may determine a periodicity of the resource blocks based at least in part on the number of the resource blocks and identities of the multiple sub-bands.

In a thirteenth aspect, alone or in combination with one or more of the first through twelfth aspects, the UE may receive information indicating whether a number of resource blocks used for the resource is proportionate to or independent of a number of sub-bands included in the multiple sub-bands.

In a fourteenth aspect, alone or in combination with one or more of the first through thirteenth aspects, the information indicating whether the number of resource blocks used for the resource is proportionate to or independent of the number of sub-bands included in the multiple sub-bands further indicates an interlace periodicity of the resource.

In a fifteenth aspect, alone or in combination with one or more of the first through fourteenth aspects, the UE may drop one or more resource blocks of the resource when an interlace configuration of the multiple sub-bands is associated with fewer resource blocks than are included in the resource.

In a sixteenth aspect, alone or in combination with one or more of the first through fifteenth aspects, the multiple sub-bands include any combination of sub-bands of a bandwidth part of the UE.

In a seventeenth aspect, alone or in combination with one or more of the first through sixteenth aspects, the multiple sub-bands include a subset of combinations of sub-bands of a bandwidth part of the UE.

In an eighteenth aspect, alone or in combination with one or more of the first through seventeenth aspects, the multiple sub-bands can include any combination of contiguous sub-bands of a bandwidth part of the UE.

In a nineteenth aspect, alone or in combination with one or more of the first through eighteenth aspects, the multiple sub-bands are configured to include a particular number of sub-bands identified from a set of quantities of sub-bands.

In a twentieth aspect, alone or in combination with one or more of the first through nineteenth aspects, the fixed resource is associated with a fixed frequency location.

In a twenty-first aspect, alone or in combination with one or more of the first through twentieth aspects, the floating resource is associated with a fixed bandwidth and a variable frequency location.

In a twenty-second aspect, alone or in combination with one or more of the first through twenty-first aspects, the adaptive resource is associated with a variable bandwidth and a variable frequency location.

In a twenty-third aspect, alone or in combination with one or more of the first through twenty-second aspects, when the uplink control channel is a dynamically scheduled uplink control channel, the control channel resource configuration includes configuration information for multiple, different resources, wherein identifying the resource is based at least in part on information indicating that the resource is to be used for the uplink control channel.

In a twenty-fourth aspect, alone or in combination with one or more of the first through twenty-third aspects, the multiple, different resources correspond to different sub-bands or different bandwidths for the uplink control channel.

In a twenty-fifth aspect, alone or in combination with one or more of the first through twenty-fourth aspects, identifying the resource further comprises identifying at least one of a time resource or a frequency resource for the uplink control channel.

In a twenty-sixth aspect, alone or in combination with one or more of the first through twenty-fifth aspects, the control channel resource configuration is common to multiple resources.

In a twenty-seventh aspect, alone or in combination with one or more of the first through twenty-sixth aspects, the control channel resource configuration is specific to the resource.

In a twenty-eighth aspect, alone or in combination with one or more of the first through twenty-seventh aspects, the control channel resource configuration is determined based at least in part on at least one of: downlink control information, or an outcome of a listen-before-talk (LBT) procedure.

In a twenty-ninth aspect, alone or in combination with one or more of the first through twenty-eighth aspects, identifying the resource further comprises identifying a sub-band, of a plurality of sub-bands, on which to transmit the uplink control channel.

In a thirtieth aspect, alone or in combination with one or more of the first through twenty-ninth aspects, the uplink control channel spans multiple sub-bands. In some aspects, the sub-band is a starting sub-band for the uplink control channel.

In a thirty-first aspect, alone or in combination with one or more of the first through thirtieth aspects, the plurality of sub-bands are identified by a sub-band usage bitmap. In some aspects, the resource is identified based at least in part on a mapping between the sub-band usage bitmap and the resource.

In a thirty-second aspect, alone or in combination with one or more of the first through thirty-first aspects, the sub-band usage bitmap is one of a plurality of sub-band usage bitmaps mapped to the resource.

In a thirty-third aspect, alone or in combination with one or more of the first through thirty-second aspects, identifying the resource further comprises identifying multiple sub-bands, of a plurality of sub-bands, on which to transmit the uplink control channel.

In a thirty-fourth aspect, alone or in combination with one or more of the first through thirty-third aspects, the multiple sub-bands are identified based at least in part on a contiguous sub-band configuration of the UE.

In a thirty-fifth aspect, alone or in combination with one or more of the first through thirty-fourth aspects, identifying the resource further comprises: identifying the resource based at least in part on a COT structure indicator that indicates one or more sub-bands available for the resource.

In a thirty-sixth aspect, alone or in combination with one or more of the first through thirty fifth aspects, identifying the resource further comprises identifying the resource based at least in part on an indication, received from a base station, of a sub-band to be used to transmit the uplink control channel.

In a thirty-seventh aspect, alone or in combination with one or more of the first through thirty-sixth aspects, the UE may identify a number of sub-bands to use for the uplink control channel.

In a thirty-eighth aspect, alone or in combination with one or more of the first through thirty-seventh aspects, when the uplink control channel is to be transmitted outside of a COT of a base station associated with the UE and the control channel resource configuration indicates that the resource is an adaptive resource or a floating resource, the resource is identified as the fixed resource.

In a thirty-ninth aspect, alone or in combination with one or more of the first through thirty-eighth aspects, the UE may selectively treat the resource as the fixed resource, the adaptive resource, or the floating resource based at least in part on a listen-before-talk procedure of the UE.

In a fortieth aspect, alone or in combination with one or more of the first through thirty-ninth aspects, the control channel resource configuration is used for uplink control information associated with channel state information and for uplink control information associated with an acknowledgment.

In a forty-first aspect, alone or in combination with one or more of the first through fortieth aspects, the control channel resource configuration is used for uplink control information associated with channel state information and for uplink control information associated with an acknowledgment.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
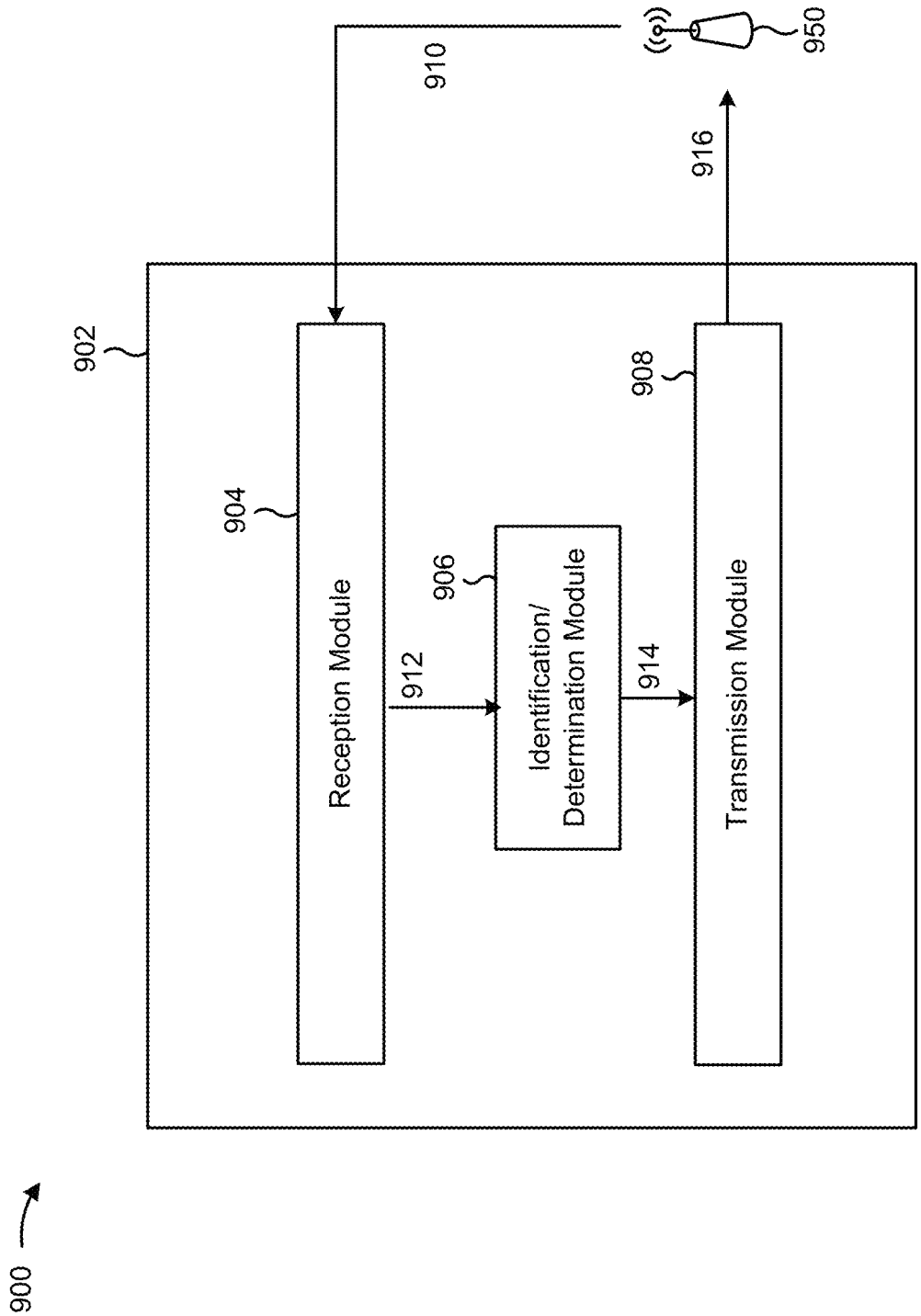
FIG. 9 is a conceptual data flow diagram illustrating a data flow between different modules/means/components in an example apparatus, in accordance with various aspects of the present disclosure.

FIG. 9 is a conceptual data flow diagram 900 illustrating a data flow between different modules/means/components in an example apparatus 902. The apparatus 902 may be a UE (e.g., UE 120). In some aspects, the apparatus 902 includes a reception component 904, an identification/determination component 906, and/or a transmission component 908.

The reception component 904 may receive signals 910 from a BS 950 (e.g., BS 110 and/or the like). The signals 910 may include, for example, a PUCCH resource configuration, a PRI, DCI, RRC signaling, information indicating whether a number of resource blocks used for a resource is proportionate to or independent of a number of sub-bands included in multiple sub-bands, and/or the like. The reception component may provide data 912 to the identification/determination component 906. In some aspects, the data 912 may identify the PUCCH resource configuration, the PRI, the DCI, the RRC signaling, the information indicating whether a number of resource blocks used for a resource is proportionate to or independent of a number of sub-bands included in multiple sub-bands, and/or the like.

The identification/determination component 906, using the data 912, may identify a control channel resource configuration associated with an unlicensed spectrum; identify the resource based at least in part on the control channel resource configuration; identify the resource based at least in part on the sub-band being identified by a configured list of sub-bands; identify the resource based at least in part on a mapping of resources and corresponding sub-bands and based at least in part on an indication, in the control channel resource configuration, indicating which resource is to be used; identify an interlace configuration for the uplink control channel from a plurality of interlace configurations associated with a set of sub-bands; determine a periodicity of the resource blocks based at least in part on the number of the resource blocks and identities of the multiple sub-bands; drop one or more resource blocks of the resource when an interlace configuration of the multiple sub-bands is associated with fewer resource blocks than are included in the resource; identify at least one of a time resource or a frequency resource for the uplink control channel; identify a sub-band, of a plurality of sub-bands, on which to transmit the uplink control channel; identify multiple sub-bands, of a plurality of sub-bands, on which to transmit the uplink control channel; identify the resource based at least in part on a COT structure indicator that indicates one or more sub-bands available for the resource; identify the resource based at least in part on an indication, received from a base station, of a sub-band to be used to transmit the uplink control channel; identify a number of sub-bands to use for the uplink control channel; selectively treat the resource as the fixed resource, the adaptive resource, or the floating resource based at least in part on a listen-before-talk procedure of the UE; and/or the like. The identification/determination component 906 may provide data 914 to the transmission component based at least in part on one or more of the identification/determination procedures described above. The data 914 may indicate a resource for UCI, an interlace configuration for the UCI, and/or the like. The transmission component 908 may transmit the uplink control information on the identified resource as signals 916.

The apparatus 902 may include additional components that perform each of the blocks of the algorithm in the aforementioned process 800 of FIG. 8 and/or the like. Each block in the aforementioned process 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
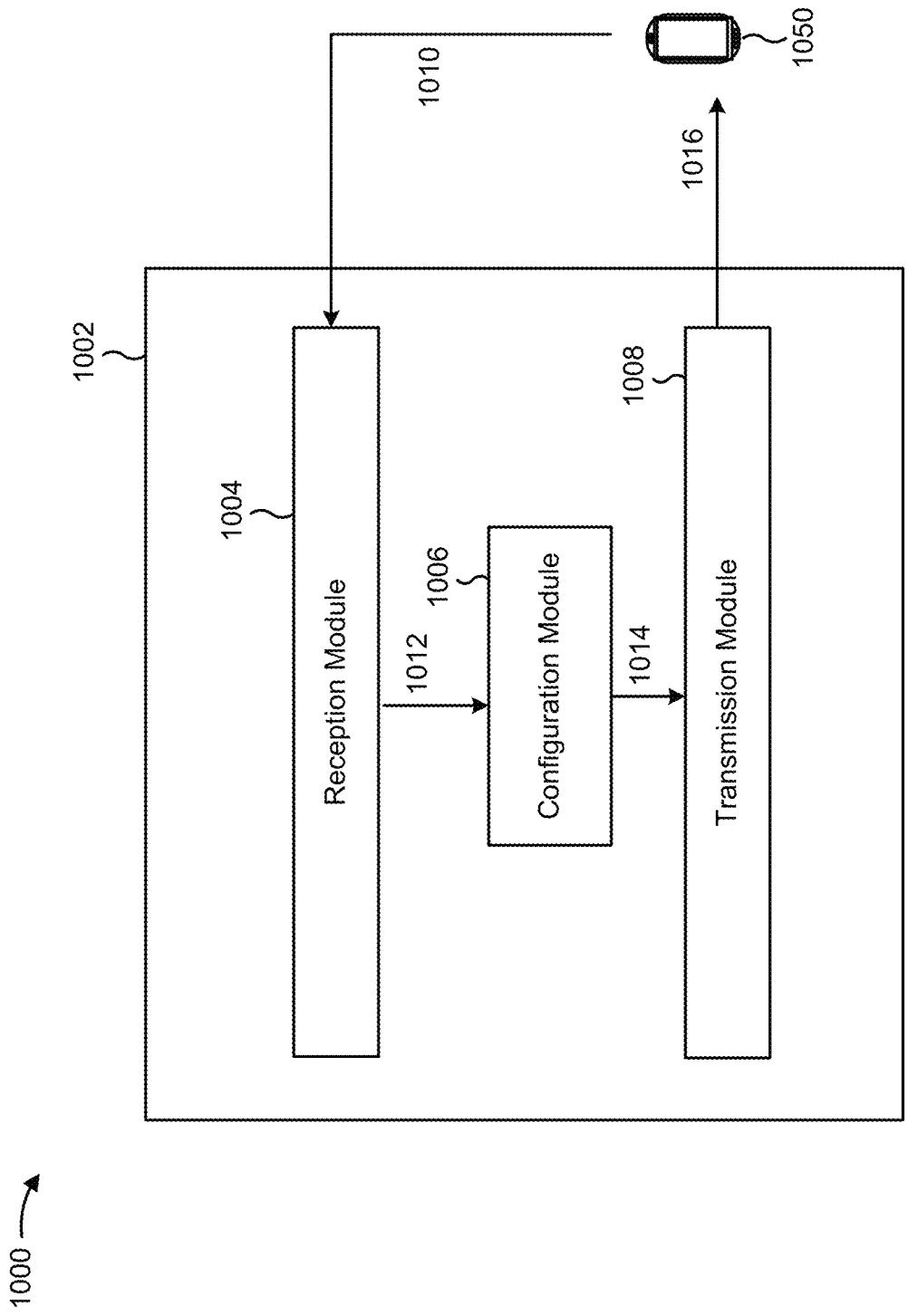
FIG. 10 is a conceptual data flow diagram illustrating a data flow between different modules/means/components in an example apparatus, in accordance with various aspects of the present disclosure.

FIG. 10 is a conceptual data flow diagram 1000 illustrating a data flow between different modules/means/components in an example apparatus 1002. The apparatus 1002 may be a base station (e.g., BS 110 and/or the like). In some aspects, the apparatus 1002 includes a reception component 1004, a configuration component 1006, and/or a transmission component 1008.

The reception component 1004 may receive, from the wireless communication device 1050, uplink control information on an identified resource as signals 1010. The reception component 1004 may provide information 1012 based at least in part on the uplink control information to the configuration component 1006 or another component of the apparatus 1002.

The configuration component 1006 may configure a control channel resource configuration associated with an unlicensed spectrum for the wireless communication device 1050; configure a list of sub-bands for the control channel resource; configure a mapping of resources and corresponding sub-bands; configure an interlace configuration for the uplink control channel from a plurality of interlace configurations associated with a set of sub-bands; and/or the like. The configuration component 1006 may provide data 1014 to the transmission component 1008 based at least in part on one or more of the configuration procedures described above. The data 1014 may indicate a configuration for transmitting UCI (e.g., a control channel resource configuration).

The transmission component 1008 may transmit signals 1016 to the wireless communication device 1050. The signals 1016 may include, for example, a PUCCH resource configuration, a PRI, DCI, RRC signaling, information indicating whether a number of resource blocks used for a resource is proportionate to or independent of a number of sub-bands included in multiple sub-bands, and/or the like.

The apparatus 1002 may include additional components that perform operations associated with the algorithm in the aforementioned process 800 of FIG. 8 and/or the like. For example, the additional components may perform operations associated with configuring a control channel resource for a UE (e.g., UE 120). The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
identifying a control channel resource configuration associated with an unlicensed spectrum, wherein the control channel resource configuration includes an indication of whether a resource, to be used for an uplink control channel in the unlicensed spectrum, is a fixed resource, a floating resource, or an adaptive resource,
wherein the fixed resource is associated with a fixed frequency location,
wherein the floating resource is associated with a fixed bandwidth and a variable frequency location, and
wherein the adaptive resource is associated with a variable bandwidth and a variable frequency location;
identifying the resource based at least in part on the control channel resource configuration; and
transmitting uplink control information on the identified resource.

2. The method of claim 1, wherein identifying the resource is based at least in part on whether a sub-band in which the resource is included is a floating sub-band or a fixed sub-band.

3. The method of claim 2, wherein, when the sub-band is a floating sub-band, identifying the resource further comprises:
identifying the resource based at least in part on the sub-band being identified by a configured list of sub-bands.

4. The method of claim 1, wherein, when the resource is the adaptive resource, identifying the resource further comprises:
identifying the resource based at least in part on a mapping of resources and corresponding sub-bands and based at least in part on an indication, in the control channel resource configuration, indicating which resource is to be used.

5. The method of claim 1, wherein identifying the resource further comprises:
identifying an interlace configuration for the uplink control channel from a plurality of interlace configurations associated with a set of sub-bands.

6. The method of claim 5, wherein the interlace configuration uses a smallest quantity of resource blocks of respective quantities of resource blocks associated with the plurality of interlace configurations.

7. The method of claim 5, wherein the uplink control channel uses all resource blocks of the interlace configuration.

8. The method of claim 1, wherein the uplink control channel spans a single sub-band.

9. The method of claim 1, wherein the uplink control channel spans multiple sub-bands.

10. The method of claim 9, wherein a quantity of resource blocks used for the resource is proportionate to a quantity of sub-bands included in the multiple sub-bands.

11. The method of claim 9, wherein a quantity of resource blocks used for the resource is independent of a quantity of sub-bands included in the multiple sub-bands.

12. The method of claim 11, further comprising:
receiving information indicating at least one of a periodicity or an offset of the resource blocks used for the resource.

13. The method of claim 9, further comprising:
receiving information indicating whether a quantity of resource blocks used for the resource is proportionate to or independent of a quantity of sub-bands included in the multiple sub-bands, wherein the information indicating whether the quantity of resource blocks used for the resource is proportionate to or independent of the quantity of sub-bands included in the multiple sub-bands further indicates an interlace periodicity of the resource.

14. The method of claim 9, further comprising:
dropping one or more resource blocks of the resource when an interlace configuration of the multiple sub-bands is associated with fewer resource blocks than are included in the resource.

15. The method of claim 1, wherein, when the uplink control channel is a dynamically scheduled uplink control channel, the control channel resource configuration includes configuration information for multiple, different resources, and
wherein identifying the resource is based at least in part on information indicating that the resource is to be used for the uplink control channel, wherein the multiple, different resources correspond to different sub-bands or different bandwidths for the uplink control channel.

16. The method of claim 1, wherein identifying the resource further comprises:
identifying at least one of a time resource or a frequency resource for the uplink control channel.

17. The method of claim 1, wherein the control channel resource configuration is common to multiple resources.

18. The method of claim 1, wherein the control channel resource configuration is specific to the resource.

19. The method of claim 1, wherein the control channel resource configuration is determined based at least in part on at least one of:
downlink control information, or
an outcome of a listen-before-talk (LBT) procedure.

20. The method of claim 1, wherein identifying the resource further comprises:
identifying a sub-band, of a plurality of sub-bands, on which to transmit the uplink control channel.

21. The method of claim 1, wherein identifying the resource further comprises:
identifying multiple sub-bands, of a plurality of sub-bands, on which to transmit the uplink control channel.

22. The method of claim 1, wherein, when the uplink control channel is to be transmitted outside of a channel occupancy time (COT) of a network entity associated with the UE, the resource is identified as the fixed resource.

23. A user equipment (UE) for wireless communication, comprising:
a memory; and
one or more processors coupled to the memory, the one or more processors configured to:
identify a control channel resource configuration associated with an unlicensed spectrum, wherein the control channel resource configuration includes an indication of whether a resource, to be used for an uplink control channel in the unlicensed spectrum, is a fixed resource, a floating resource, or an adaptive resource,
wherein the fixed resource is associated with a fixed frequency location,
wherein the floating resource is associated with a fixed bandwidth and a variable frequency location, and wherein the adaptive resource is associated with a variable bandwidth and a variable frequency location;

identify the resource based at least in part on the control channel resource configuration; and transmit uplink control information on the identified resource.

24. The UE of claim 23, wherein the one or more processors, when identifying the resource, are configured to:

identify the resource based at least in part on whether a sub-band in which the resource is included is a floating sub-band or a fixed sub-band.

25. The UE of claim 24, wherein, when the sub-band is a floating sub-band, the one or more processors, when identifying the resource, are further configured to:

identify the resource based at least in part on the sub-band being identified by a configured list of sub-bands.

26. The UE of claim 23, wherein the uplink control channel spans multiple sub-bands.

27. A non-transitory computer-readable medium storing a set of instructions for wireless communication, the set of instructions comprising:

one or more instructions that, when executed by one or more processors of a user equipment (UE), cause the UE to:

identify a control channel resource configuration associated with an unlicensed spectrum, wherein the control channel resource configuration includes an indication of whether a resource, to be used for an uplink control channel in the unlicensed spectrum, is a fixed resource, a floating resource, or an adaptive resource, wherein the fixed resource is associated with a fixed frequency location, wherein the floating resource is associated with a fixed bandwidth and a variable frequency location, and wherein the adaptive resource is associated with a variable bandwidth and a variable frequency location;

identify the resource based at least in part on the control channel resource configuration; and transmit uplink control information on the identified resource.

28. The non-transitory computer-readable medium of claim 27, wherein the one or more instructions, that cause the UE to identify the resource, cause the UE to:

identify the resource based at least in part on whether a sub-band in which the resource is included is a floating sub-band or a fixed sub-band.

29. An apparatus for wireless communication, comprising:

means for identifying a control channel resource configuration associated with an unlicensed spectrum, wherein the control channel resource configuration includes an indication of whether a resource, to be used for an uplink control channel in the unlicensed spectrum, is a fixed resource, a floating resource, or an adaptive resource, wherein the fixed resource is associated with a fixed frequency location, wherein the floating resource is associated with a fixed bandwidth and a variable frequency location, and wherein the adaptive resource is associated with a variable bandwidth and a variable frequency location;

means for identifying the resource based at least in part on the control channel resource configuration; and means for transmitting uplink control information on the identified resource.

30. The apparatus of claim 29, wherein the means for identifying the resource comprises:

means for identifying the resource based at least in part on whether a sub-band in which the resource is included is a floating sub-band or a fixed sub-band.

\* \* \* \* \*